(12) United States Patent
Shimoda et al.

(10) Patent No.: US 10,763,484 B2
(45) Date of Patent: Sep. 1, 2020

(54) WIRING MODULE AND POWER STORAGE MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hiroki Shimoda, Yokkaichi (JP); Shinichi Takase, Yokkaichi (JP); Nobuyuki Matsumura, Yokkaichi (JP); Yoshinori Ito, Yokkaichi (JP); Hideo Takahashi, Yokkaichi (JP)

(73) Assignees: AUTONETWORKS TECHNOLOGIES, LTD., Yokkaichu (JP); SUMITOMO WIRING SYSTEMS, LTD., Yokkaichi (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 111 days.

(21) Appl. No.: 16/069,109

(22) PCT Filed: Jan. 6, 2017

(86) PCT No.: PCT/JP2017/000203
§ 371 (c)(1),
(2) Date: Jul. 10, 2018

(87) PCT Pub. No.: WO2017/126328
PCT Pub. Date: Jul. 27, 2017

(65) Prior Publication Data
US 2019/0006653 A1    Jan. 3, 2019

(30) Foreign Application Priority Data

Jan. 19, 2016 (JP) .................................. 2016-007817

(51) Int. Cl.
| | |
|---|---|
| *H01M 2/20* | (2006.01) |
| *H01G 11/10* | (2013.01) |
| *H01G 2/04* | (2006.01) |
| *H01G 11/78* | (2013.01) |
| *H01G 11/76* | (2013.01) |
| *H01M 2/34* | (2006.01) |
| *H01M 2/10* | (2006.01) |
| *H01M 10/42* | (2006.01) |
| *H01R 11/11* | (2006.01) |

(52) U.S. Cl.
CPC .............. *H01M 2/206* (2013.01); *H01G 2/04* (2013.01); *H01G 11/10* (2013.01); *H01G 11/76* (2013.01); *H01G 11/78* (2013.01); *H01M 2/1077* (2013.01); *H01M 2/34* (2013.01); *H01M 10/425* (2013.01); *H01R 11/11* (2013.01); *H01M 2220/20* (2013.01)

(58) Field of Classification Search
CPC .. H01M 2/206; H01M 10/425; H01M 2/1077; H01R 11/11
See application file for complete search history.

(56) References Cited

U.S. PATENT DOCUMENTS

2014/0079982 A1    3/2014 Laderer et al.

FOREIGN PATENT DOCUMENTS

| JP | 2015022965 A | | 2/2015 |
|---|---|---|---|
| JP | 2015133223 A | | 7/2015 |
| WO | WO 2014024760 | * | 2/2013 |

OTHER PUBLICATIONS

International Search Report and Written Opinion for Application No. PCT/JP2017/000203 dated Apr. 4, 2017; 4 pages.

* cited by examiner

*Primary Examiner* — Ladan Mohaddes
(74) *Attorney, Agent, or Firm* — Reising Ethington, P.C.

(57) ABSTRACT

A wiring module includes multiple bus bars, a resin protector that has one or more holding portions that hold the bus bars and is provided with a tolerance absorbing portion that absorbs tolerance in the arrangement direction of power storage elements, and a cover that is attached to the resin protector and holds all of the holding portions. The resin protector is provided with a locking portion that locks the cover, the locking portion projecting in a direction identical to the projecting direction of electrode terminals and extending along the arrangement direction of the power storage elements. The cover is provided with a lock-receiving portion that is locked to the locking portion. The locking portion and the lock-receiving portion are locked in a manner of enabling relative movement along the arrangement direction of the power storage elements at an edge portion of the cover that extends in the arrangement direction of the power storage elements.

8 Claims, 13 Drawing Sheets

WIRING MODULE AND POWER STORAGE MODULE

CROSS REFERENCE TO RELATED APPLICATIONS

This application claims the priority of Japanese patent application JP2016-007817 filed on Jan. 19, 2016, the entire contents of which are incorporated herein.

TECHNICAL FIELD

The technology disclosed in the present specification relates to a wiring module and a power storage module.

BACKGROUND ART

In a battery module for an electric automobile or a hybrid vehicle, electric cells are arranged side-by-side and each have an electrode face provided with positive and negative electrode terminals. In this type of battery module, the electric cells are thus electrically connected to each other by using electrically conductive connection members (bus bars) to connect positive electrode terminals (cathode terminals) and negative electrode terminals (anode terminals) that are adjacent to each other.

A wiring module used to connect electric cells includes an insulating holding member (resin protector) that holds a group of bus bars. One example of this type of wiring module is covered by an insulating cover so that after attachment to the electric cell group, and after the adjacent electrode terminals are electrically connected to each other, the electrode terminals, the bus bars, and the like are insulated from other components, tools, and the like, and the protrusion of electrical wires is prevented, for example (JP 2013-37986A). The cover is fixed to the resin protector by a locking portion provided in the resin protector being locked to a lock-receiving portion provided in the cover. This locking structure is provided on a side face of the wiring module (a face that intersects the electrode faces).

Incidentally, technology has been proposed for enabling the resin protector to extend and retract in the electrode terminal connection direction in order to prevent problems in the assembly of the electrode terminals and the bus bars that are caused by assembly tolerance or dimensional tolerance of the electric cells and the resin protector, for example.

If the resin protector is capable of extending and retracting so as to have a variable length dimension in this way, the position of the locking portion of the resin protector changes, and therefore the cover is also required to have a configuration capable of accommodating a change in the locking position. For example, it is necessary to divide the cover into multiple pieces and provide the locking structure with a means for adjusting the locking position.

SUMMARY

With a cover configured to cover the entirety of the resin protector, it is necessary to provide a locking structure in which the locking position can be adjusted. However, in the case where the locking position changes in this way, it is not sufficient that the locking state of the locking portion and the lock-receiving portion arranged on the side face of the wiring module is merely checked by touch, and it has been necessary to tilt the battery module each time and change the viewpoint in order to visually check whether the locked state is reliable.

The technology disclosed in the present specification was achieved in light of the above-described circumstances, and an object of the technology is to provide a wiring module and a power storage module with which the locked state of the cover to the resin protector can be visually checked easily.

One aspect of technology disclosed in the present specification is a wiring module capable of attachment to a power storage element group in which a plurality of power storage elements are arranged side-by-side, each of the power storage elements having an electrode face on which positive and negative electrode terminals are provided, the wiring module including: a plurality of bus bars that electrically connect the electrode terminals to each other; a resin protector that has one or a plurality of holding portions that hold the plurality of bus bars, and is provided with a tolerance absorbing portion that absorbs tolerance in an arrangement direction of the power storage elements; and a cover that is attached to the resin protector and covers all of the holding portions, wherein the resin protector is provided with a locking portion that locks the cover, the locking portion projecting in a direction identical to a projecting direction of the electrode terminals and extending along the arrangement direction, the cover is provided with a lock-receiving portion that is locked to the locking portion, and the locking portion and the lock-receiving portion are locked in a manner of enabling relative movement along the arrangement direction at an edge portion of the cover that extends in the arrangement direction.

According to this wiring module, the locking portion of the resin protector is provided projecting in the same direction as the projecting direction of the electrode terminals and is locked to the lock-receiving portion of the cover, and therefore the locked state of the cover to the resin protector can be easily visually checked from the direction in which the wiring module is attached to the power storage element group. Moreover, the lock-receiving portion is provided in the edge portion of the cover that extends in the arrangement direction of the power storage elements, and therefore there is no need to provide a locking hole in a region of the cover that is inward of the edge portion, and it is possible to suppress the intrusion of foreign matter into the resin protector.

The wiring module may have configurations described below.

A configuration is possible in which the locking portion includes a first locking portion that is provided on one side corresponding to one of a pair of edge portions that extend in the arrangement direction of the power storage elements, and a second locking portion that is provided on another side corresponding to another one of the pair of edge portions, and the first locking portion and the second locking portion are a plurality of locking claws that rise in the direction identical to the projecting direction of the electrode terminals. According to this configuration, the resin protector can be provided with the locking portion with use of a simple configuration.

A configuration is possible in which the lock-receiving portion extends in a continuous manner along the arrangement direction of the power storage elements. According to this configuration, the locking portion can be locked at any position on the edge portion of the cover.

A configuration is possible in which a fixing portion that fixes the cover to the resin protector is provided on one end side, with respect to the arrangement direction of the power storage elements, of the resin protector and the cover. According to this configuration, a portion of the cover can be fixed so as to not separate from the resin protector, while also enabling the cover to move in the arrangement direction of the power storage elements relative to the resin protector (enabling tolerance absorption).

A configuration is possible in which the power storage elements are arranged side-by-side with the electrode faces facing upward, the cover includes a recessed portion that extends in the arrangement direction of the power storage elements and is recessed toward a holding portion side in a state of covering the holding portions, and an opening portion that is open laterally from the power storage element group is provided in at least a portion of two end portions of the recessed portion in the arrangement direction of the power storage elements.

According to this configuration, if moisture adheres to the upper face of the cover, the moisture accumulates inside the recessed portion, thus making it possible to suppress the case where moisture flows from the side edges of the cover into the resin protector or to the electrode faces of the power storage elements. Also, the moisture accumulated in the recessed portion can be discharged laterally from the power storage elements (to a portion not in contact with the electrode faces) through the first opening portion.

Also, a configuration is possible in which a descending portion is provided descending downward from the opening portion, and lead-out ribs are provided rising outward on two side edges of the descending portion. According to this configuration, moisture that is discharged from the first opening portion falls downward along the descending portion and the lead-out ribs, and therefore it is possible to more reliably suppress the case where moisture flows around to the underside of the cover and intrudes into the resin protector.

Furthermore, a configuration is possible in which the length of the cover in the arrangement direction of the power storage elements is set longer than a maximum length of the resin protector in the arrangement direction of the power storage elements, and two end portions of the cover in the arrangement direction of the power storage elements are arranged at positions separated from two end portions of the resin protector in the arrangement direction of the power storage elements.

According to this configuration, it is possible to more reliably suppress the case where moisture that falls from the two end portions of the cover intrudes into the resin protector.

Also, another aspect of the technology disclosed in the present specification is a power storage module that includes a power storage element group and any of the above-described wiring modules that is attached to the power storage element group.

According to a wiring module and a power storage module disclosed in the present specification, the locked state of a cover to a resin protector can be visually checked easily.

DESCRIPTION OF EMBODIMENTS

Figure 1:
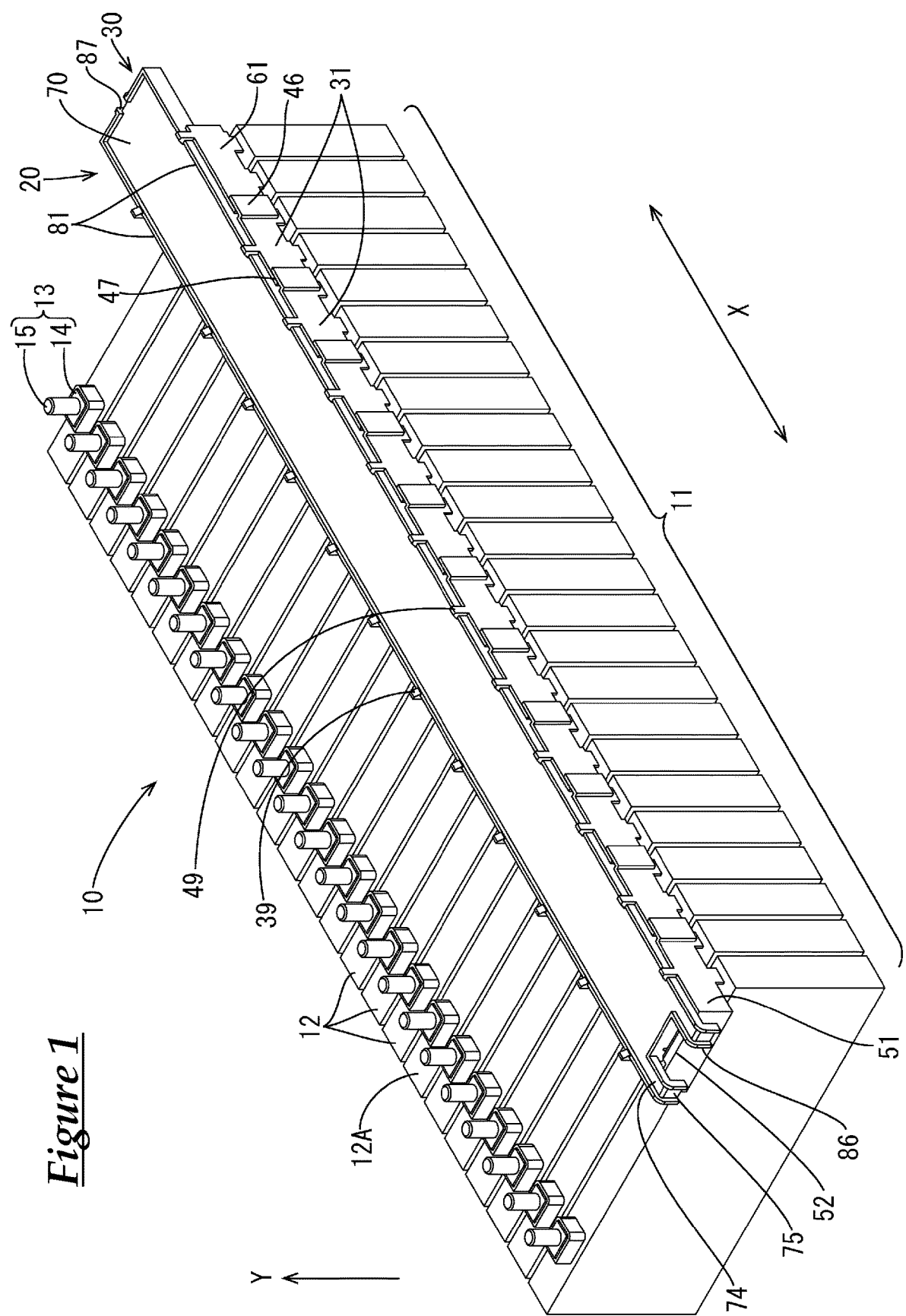
FIG. 1 is a perspective view of a battery module according to an embodiment.

An embodiment will be described below with reference to FIGS. 1 to 13.

A battery module 10 (one example of a power storage module) according to the present embodiment is for installation in a vehicle (not shown) such as an electric automobile or a hybrid automobile, and is used as a power supply for driving the vehicle. The battery module 10 has an electric cell group 11 (one example of a power storage element group) in which electric cells 12 (one example of power storage elements), each including positive and negative electrode terminals 13, are arranged side-by-side. The electrode terminals 13 are electrically connected to each other by a wiring module 20 (see FIGS. 1 and 3).

Note that in the following description, the upper side and the lower side in FIGS. 1 to 4 are respectively considered to be the upper direction and the lower directions. Also, the left side and the right side in FIG. 5 are respectively considered to be the leftward or lateral direction and the rightward or lateral direction. Also, in the case of members that are the same, there are cases where some members are denoted by reference signs and other members are not denoted by reference signs.

Each electric cell 12 has a flattened approximately rectangular parallelepiped shape. A power generation element (not shown) is housed inside the electric cell 12. A pair of electrode terminals 13 are formed on the upper face of the electric cell 12 and project upward (Y direction in FIG. 1) at positions toward respective end portions in the lengthwise direction. The upper face of the electric cell 12 is an electrode face 12A. One of the electrode terminals 13 is a cathode terminal, and the other is an anode terminal. The electrode terminal 13 that constitutes the cathode terminal and the electrode terminal 13 that constitutes the anode terminal have the same shape and same size. The electrode terminals 13 each include an electrode post 15 that is rod-shaped and projects upward from a metallic terminal block 14, and a screw thread (not shown) is formed on the outer surface of the electrode post 15. The electric cells 12 are arranged such that electrode terminals 13 having different polarities are adjacent to each other. The electric cells 12 are arranged side-by-side in the horizontal direction in FIG. 5 (X direction in FIG. 5), thus constituting the electric cell group 11.

The wiring module 20 includes: multiple bus bars 21 (see FIGS. 6 and 7) that are made of a metal and each have a pair of terminal through-holes 22 for insertion of and connection to the electrode posts 15 of the positive and negative electrode terminals 13 of electric cells 12; a resin protector 30 that is made of a synthetic resin and has bus bar holding portions 32 that hold the bus bars 21; voltage detection terminals (not shown) that are placed on and electrically connected to the bus bars 21; detection electrical wires (not shown) that are connected to the voltage detection terminals; and a cover 70 that covers an open face (upper face) of the resin protector 30.

Each bus bar 21 is formed by a metallic plate member, which is made of copper, a copper alloy, stainless steel (SUS), aluminum, or the like, being folded in two and pressed into a predetermined shape, and has an approximately rectangular shape overall. The surface of the bus bar 21 may be plated with a metal such as tin or nickel. The pair of terminal through-holes 22 have a circular shape for insertion of the electrode posts 15 of the electrode terminals 13, and are formed penetrating the bus bar 21. The terminal through-holes 22 are set slightly larger than the diameter of the electrode posts 15. The electrode terminals 13 and the bus bar 21 are electrically connected by screwing nuts (not shown) onto the electrode posts 15 inserted into the terminal through-holes 22 such that the bus bar 21 is sandwiched between the nuts and the terminal block 14.

Figure 3:
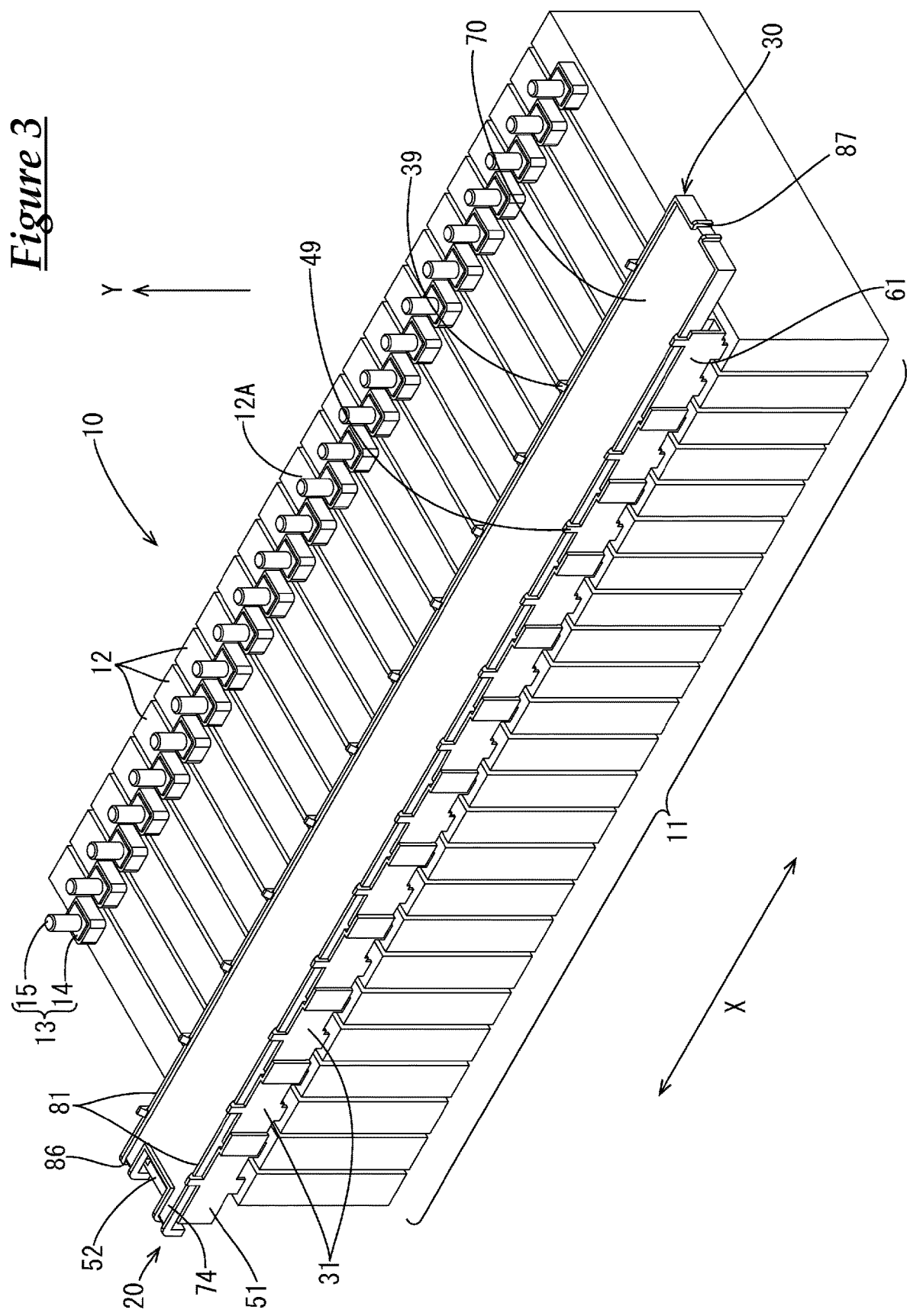
FIG. 3 is likewise a perspective view of the battery module.

The resin protector 30 is obtained by coupling multiple coupling units 31, and has a long and narrow shape in the arrangement direction of the electric cells 12 as shown in FIGS. 1 and 3. The resin protector 30 includes multiple bus bar holding portions 32 that are each open in the vertical direction and house and hold a bus bar 21, and a wire housing groove 41 that houses the detection electrical wires (not shown) connected to the voltage detection terminals (not shown) provided on the bus bars 21, and the bus bar holding portions 32 and the wire housing groove 41 are provided extending along the lengthwise direction of the resin protector 30 (see FIG. 6).

Figure 6:
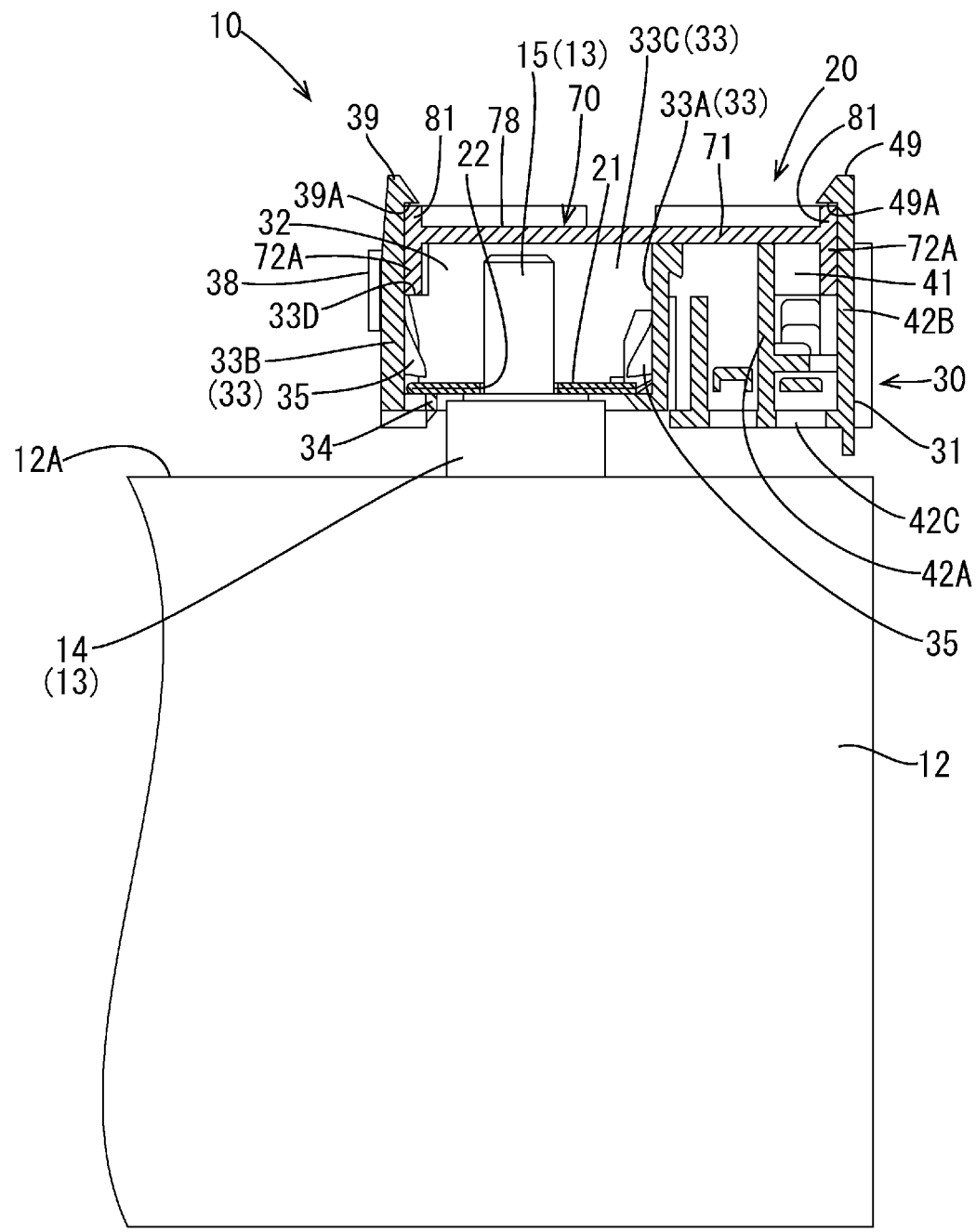
FIG. 6 is a cross-sectional view taken along A-A in FIG. 5.
Figure 7:
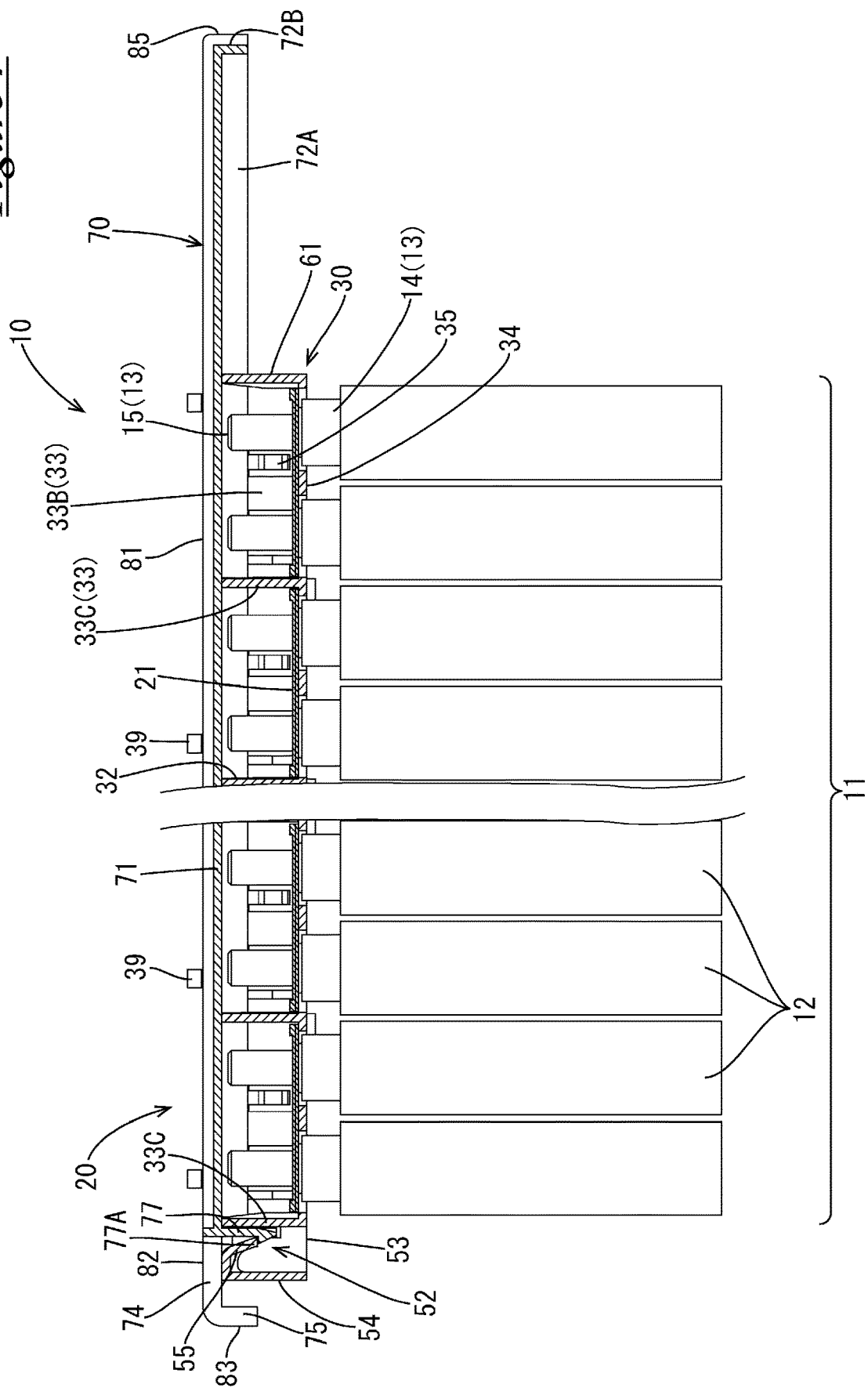
FIG. 7 is a cross-sectional view taken along B-B in FIG. 5 (state where power storage elements are arranged side-by-side with minimum tolerance).
Figure 8:
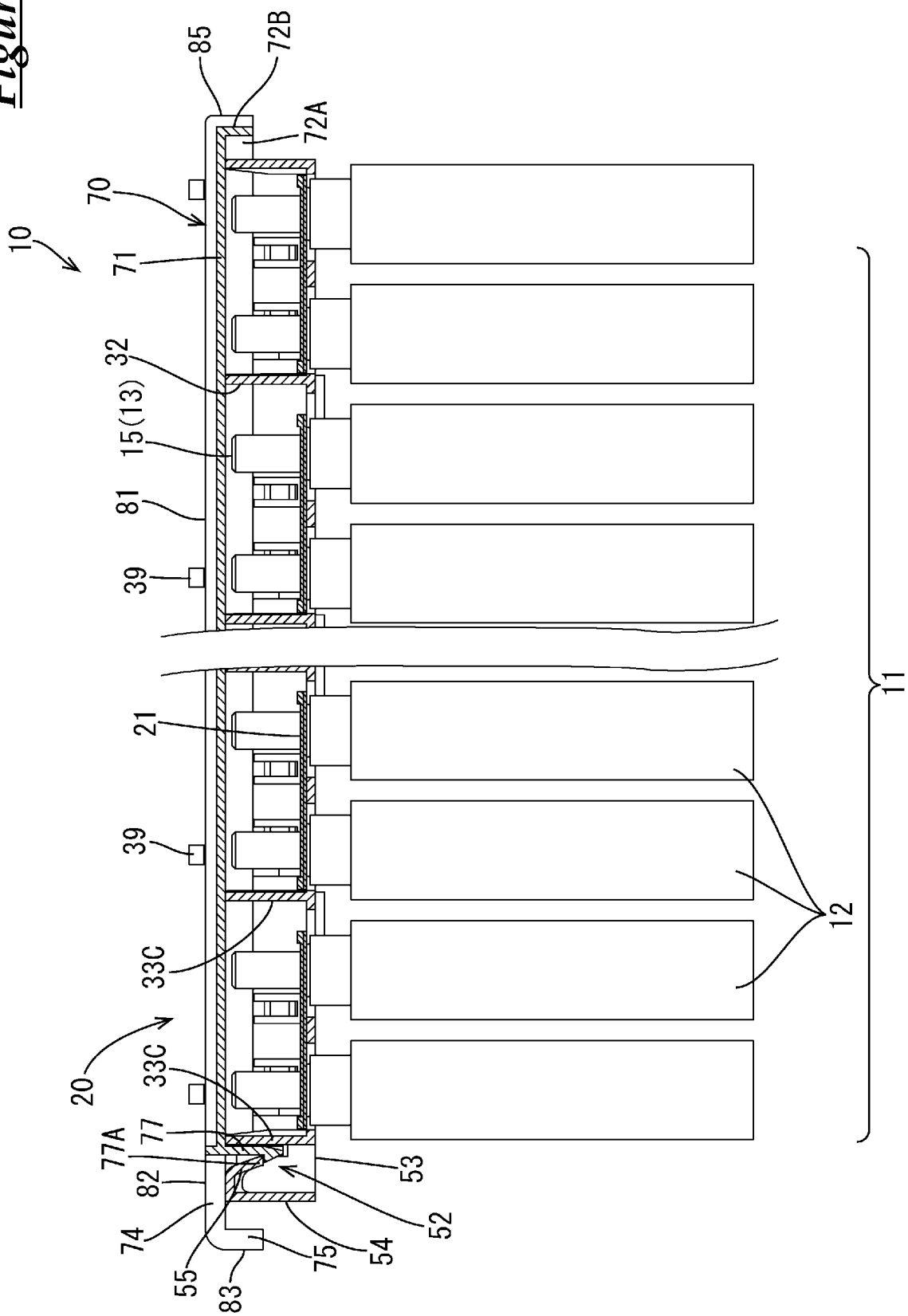
FIG. 8 is a cross-sectional view taken along B-B in FIG. 5, and shows a state where the power storage elements are arranged side-by-side with maximum tolerance.

The bus bar holding portions 32 each have a holding wall 33 that rises upward and holds a bus bar 21 therein and insulates it from adjacent bus bars 21, and the bus bar holding portions 32 are formed with a size capable of housing the bus bars 21 (see FIGS. 6 and 7). The holding walls 33 also function as protection walls for protection of the adjacent electrode terminals 13. The bottom portion of each bus bar holding portion 32 is provided with a platform portion 34 on which the peripheral edge portion and lengthwise central portion of the bus bar 21 is placed.

In the following, a groove-side wall portion 33A refers to a wall portion of the holding wall 33 that is located on the wire housing groove 41 side, an outer wall portion 33B refers to a wall portion that is located on the side opposite to the wire housing groove, and a dividing wall 33C refers to a wall portion that is located between adjacent bus bar holding portions 32.

The groove-side wall portion 33A of the holding wall 33 has a partial cutout and is continuous with a barrel holding groove (not shown) that holds the wire connection portion of a voltage detection terminal, thus allowing the detection electrical wire to be drawn out from the bus bar holding portion 32 toward the wire housing groove 41.

Also, portions of the groove-side wall portion 33A and the outer wall portion 33B are cut out to provide a pair of retaining pieces 35 for locking the bus bar 21 from above to prevent upward removal of the bus bar 21.

On the other hand, the wire housing groove 41 has a pair of groove wall portions 42A and 42B and a bottom portion 42C, and is provided extending along the arrangement direction of the bus bar holding portions 32.

A portion is cut out from the holding portion-side groove wall 42A, which is the one of the groove wall portions 42A and 42B that is on the bus bar holding portion 32 side, and the holding portion-side groove wall 42A is continuous with the aforementioned barrel holding groove (not shown) to allow the detection electrical wire to be introduced into the wire housing groove 41 from the bus bar holding portion 32 side.

The resin protector 30 is constituted by coupling multiple coupling units 31 that are provided separately for each bus bar holding portion 32.

As shown in FIG. 5, in the outer wall portion 33B of one coupling unit 31, one end side in the extending direction of the resin protector 30 (right side in FIG. 5) is a holding portion-side first coupling portion 36 that is made thinner by cutting out a portion of the inward side. Also, the other end side is a holding portion-side second coupling portion 37 that is made thinner by cutting out a portion of the outer side, and an engaging piece 38 that protrudes outward and is bent downward into an L shape is provided at an upper end of the holding portion-side second coupling portion 37 (see FIG. 6). The holding portion-side second coupling portion 37 of an adjacent coupling unit 31 is overlapped with the inward side of the holding portion-side first coupling portion 36 of one coupling unit 31, and the engaging piece 38 provided in the holding portion-side second coupling portion 37 engages with the holding portion-side first coupling portion 36 from above and the outward side, thus sandwiching the holding portion-side first coupling portion 36 along with the holding portion-side second coupling portion 37, thereby coupling the adjacent coupling units 31 together.

Note that at this time, the engaging piece 38 engages with the holding portion-side first coupling portion 36 in a manner of being capable of moving in the extending direction of the resin protector 30. In other words, the resin protector 30 can absorb tolerance in the extending direction thereof.

Also, one end side (right side in FIG. 5) of an outer groove wall 42B, which is the one of the groove wall portions 42A and 42B that is on the side opposite to the bus bar holding portion 32, is bent outward in a crank shape, where the portion protruding outward is a groove portion-side first coupling portion 46, and the other end side is a groove portion-side second coupling portion 47. The groove portion-side second coupling portion 47 of an adjacent coupling unit 31 is fitted inward of the groove portion-side first coupling portion 46 of one coupling unit 31, and thus the adjacent coupling units 31 are coupled (see FIG. 2).

Note that the groove portion-side second coupling portion 47 is capable of moving in the extending direction of the resin protector 30 inside the groove portion-side first coupling portion 46. In other words, the resin protector 30 can absorb tolerance in the extending direction thereof.

Furthermore, a first cover locking portion 39 is provided upright on an upper end edge of the outer wall portion 33B of each of the coupling units 31, and a second cover locking portion 49 is provided upright on the upper end edge of the outer groove wall 42B. The first cover locking portion 39 and the second cover locking portion 49 project so as to rise upward (Y direction in FIG. 1, which is the same direction as the projecting direction of the electrode terminals 13) from the upper end edges of the outer wall portion 33B and the outer groove wall 42B, and the leading ends are provided with locking claws 39A and 49A that project toward the interior of the resin protector 30. The locking claws 39A and 49A have a shape in which the lower end projects in a step-like manner, and the upper portion decreases in projecting dimension to be inclined outward. The locking claws 39A and 49A of the first cover locking portion 39 and the second cover locking portion 49 are locked to later-described lock-receiving ribs 81 on the upper face of the cover 70, and therefore the bus bar holding portion 32 and the wire housing groove 41 can be obstructed by the cover 70.

A fixed-side end coupling unit 51 and a free-side end coupling unit 61 are respectively coupled to the two end portions of the resin protector 30 in which the coupling units 31 are coupled.

Figure 2:
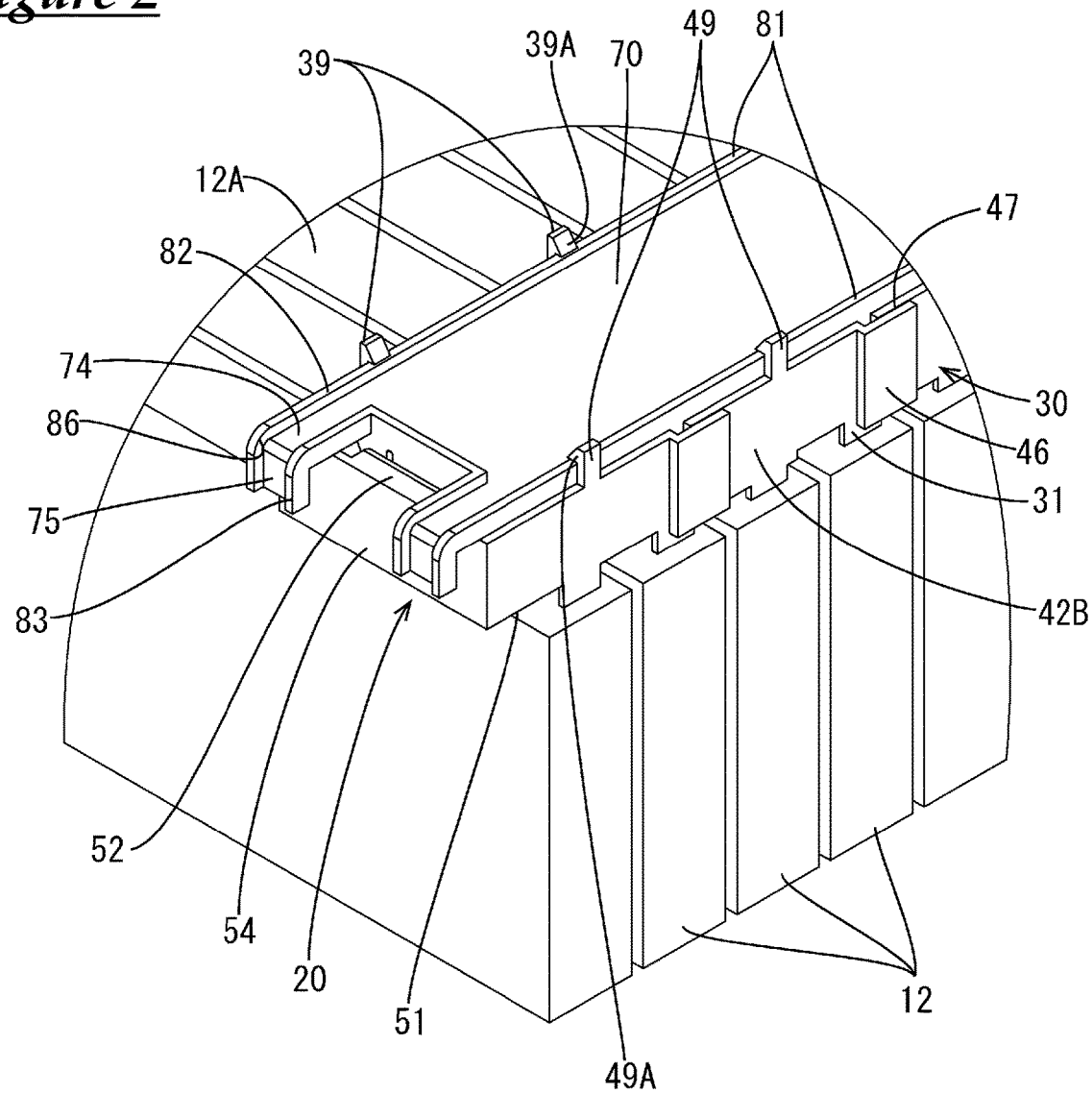
FIG. 2 is an enlarged perspective view of a portion of FIG. 1.

The fixed-side end coupling unit 51 is the coupling unit that is coupled to the left end in FIGS. 1 and 2 for example, and one end side thereof in the extending direction of the resin protector 30 (the side connected to the coupling unit 31 arranged on the inward side, which is the right side in FIGS. 1 and 2) has the same shape as the above-described first coupling portions 36 and 46 of the coupling unit 31, and can be coupled to the adjacent coupling unit 31. Also, the other end side (the left side in FIGS. 1 and 2) extends with a longer length than the above-described coupling unit 31, and includes a later-described cover fixing portion 52 that fixes the cover 70 at the end portion. The cover fixing portion 52 is provided at a position protruding outward from the upper face of the electric cell group 11 in the state where the wiring module 20 is attached to the electric cell group 11 (see FIG. 5).

Figure 9:
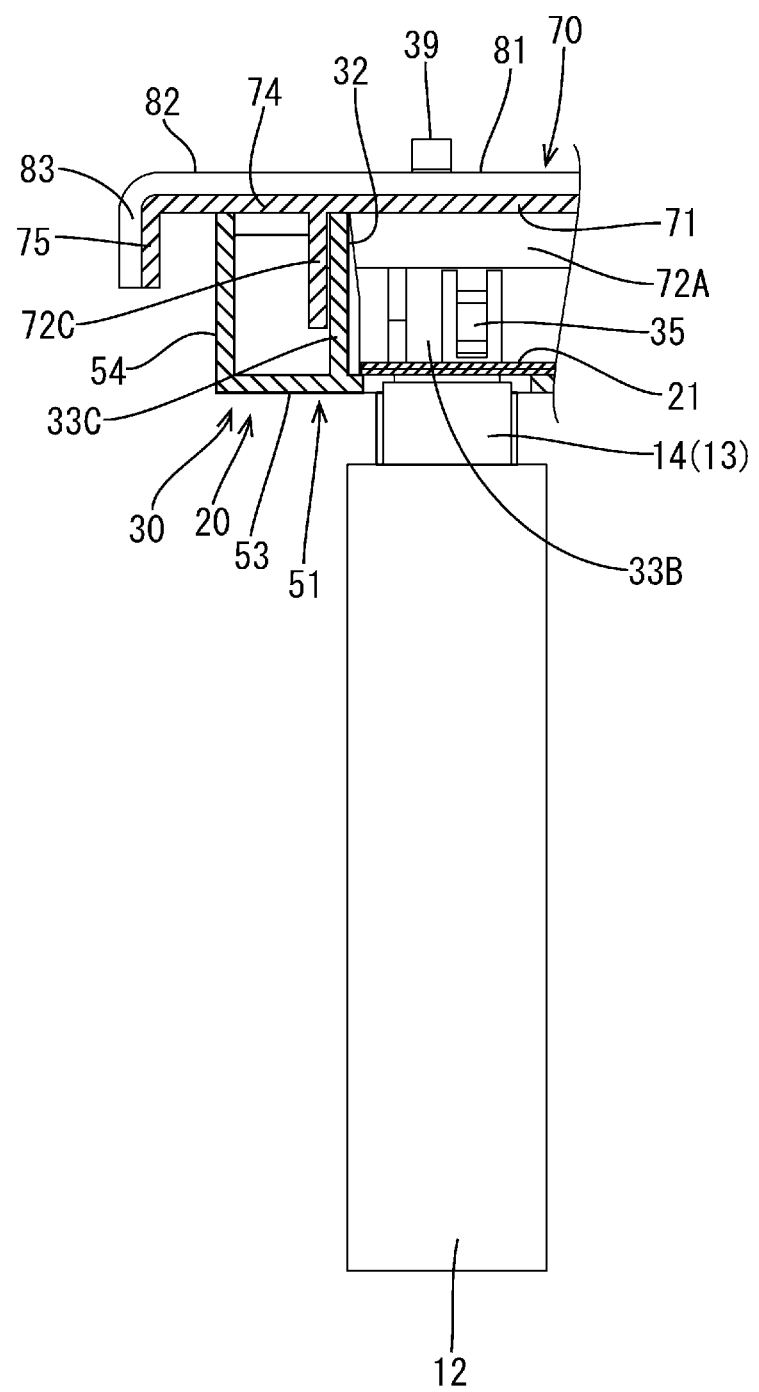
FIG. 9 is a cross-sectional view taken along C-C in FIG. 5.

As shown in FIG. 9, the end portion on the above-described other end side (end portion on the left side in FIGS. 1 and 2) of the fixed-side end coupling unit 51 includes a pair of bottom walls 53 that extend horizontally in the extending direction of the resin protector 30 from the lower edge of the dividing wall 33C at the two end portions in the width direction of the resin protector 30, and a support wall 54 that rises up in an L shape upward from the bottom walls 53. The support wall 54 is provided extending over the entire range in the width direction of the resin protector 30. The support wall 54 has the same height as the dividing wall 33C of the bus bar holding portion 32. Note that the outer wall portion 33B and the outer groove wall 42B of the fixed-side end coupling unit 51 extend to a position of being integrally continuous with the support wall 54.

As shown in FIG. 7, the upper end of the region of the support wall 54 that is provided between the pair of bottom walls 53 is provided with an elastic locking piece 55 that extends diagonally downward toward the bus bar holding portion 32. When the later-described cover 70 is attached to the resin protector 30, a locking claw 77A of a fixing piece 77 of the cover 70 is inserted between the elastic locking piece 55 and the dividing wall 33C of the bus bar holding portion 32, and locked to the lower edge of the elastic locking piece 55, thus fixing the one end side of the cover 70 to the resin protector 30.

Figure 4:
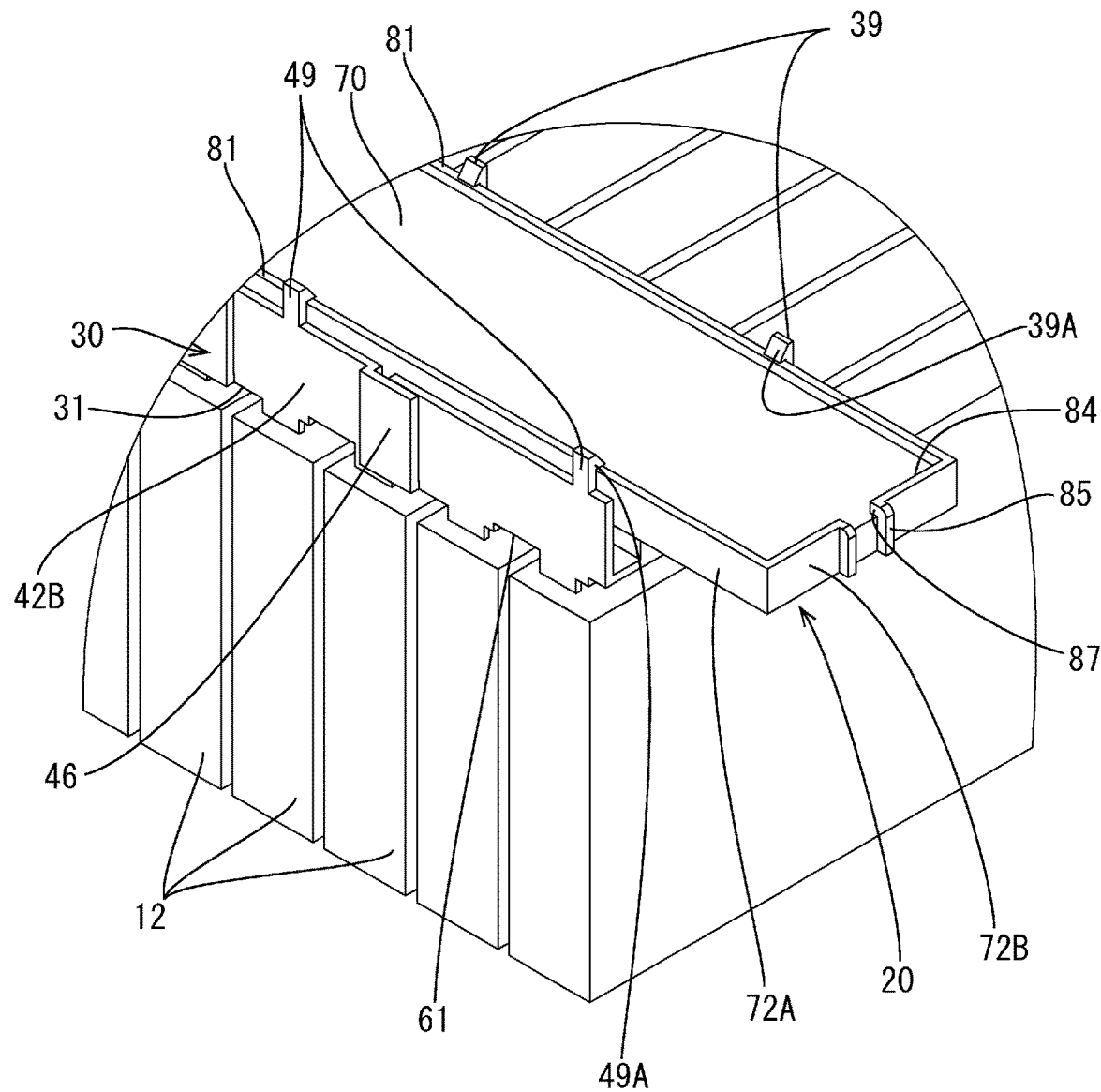
FIG. 4 is an enlarged perspective view of a portion of FIG. 3.
Figure 5:
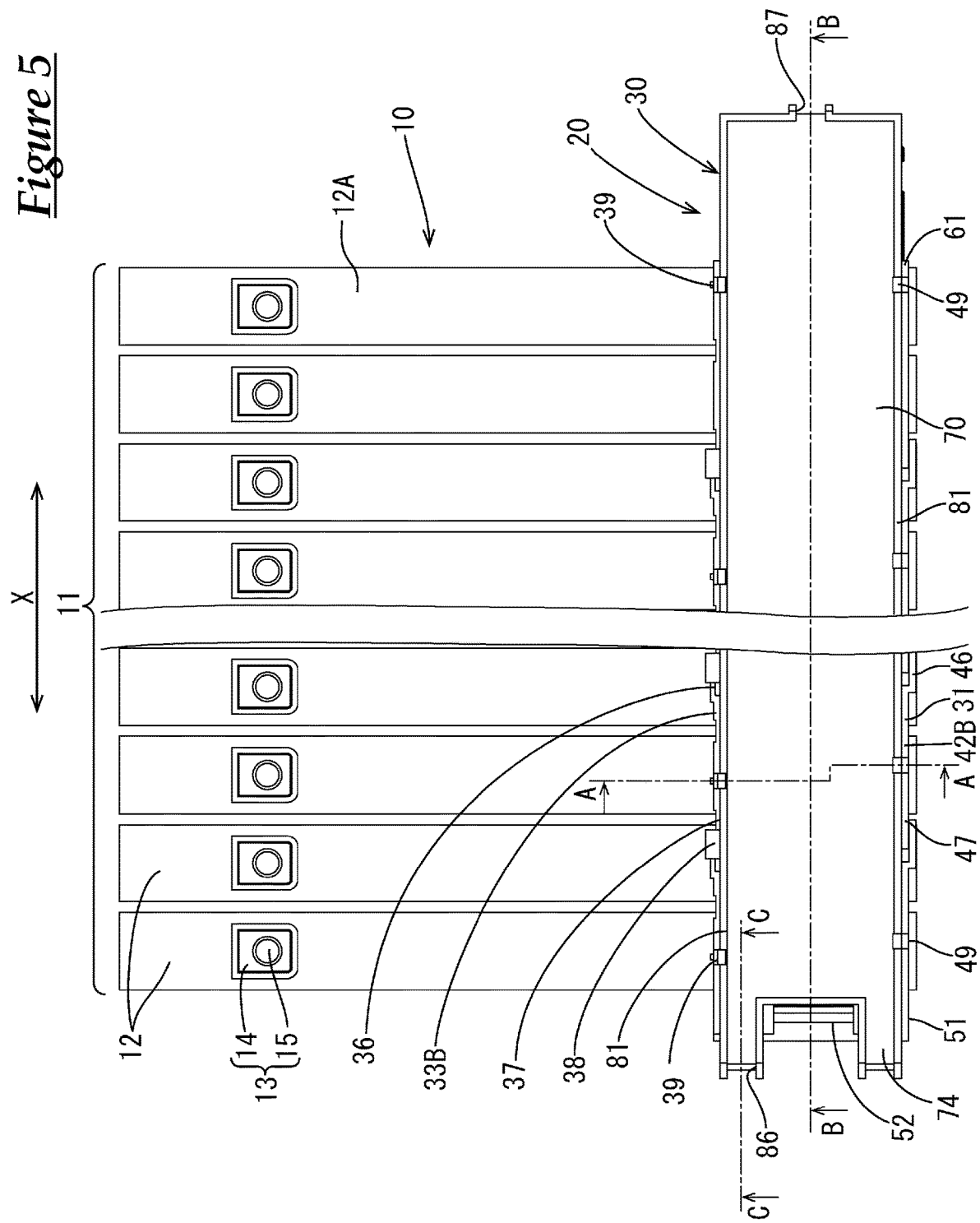
FIG. 5 is a plan view of the battery module.

On the other hand, the free-side end coupling unit 61 is the coupling unit that is coupled to the right end in FIGS. 3 and 4 for example, and one end side thereof in the extending direction of the resin protector 30 (the side connected to the coupling unit 31 arranged on the inward side, which is the left side in FIGS. 3 and 4) has the same shape as the above-described second coupling portions 37 and 47 of the coupling unit 31, and can be coupled to the adjacent coupling unit 31. Also, the other end side (right side in FIGS. 3 and 4) does not include the first coupling portions 36 and 46 provided in the above-described coupling unit 31.

Also, the position of the first cover locking portion 39 provided in the outer wall portion 33B of the above-described coupling unit 31 and the position of the second cover locking portion 49 provided in the outer groove wall 42B are different, and in the free-side end coupling unit 61, the first cover locking portion 39 and the second cover locking portion 49 are provided in the vicinity of the end portion on the above-described other end side (right side in FIGS. 3 and 4).

The bus bar holding portions 32 and the wire housing grooves 41 of the above-described resin protector 30 are covered by the cover 70.

Figure 10:
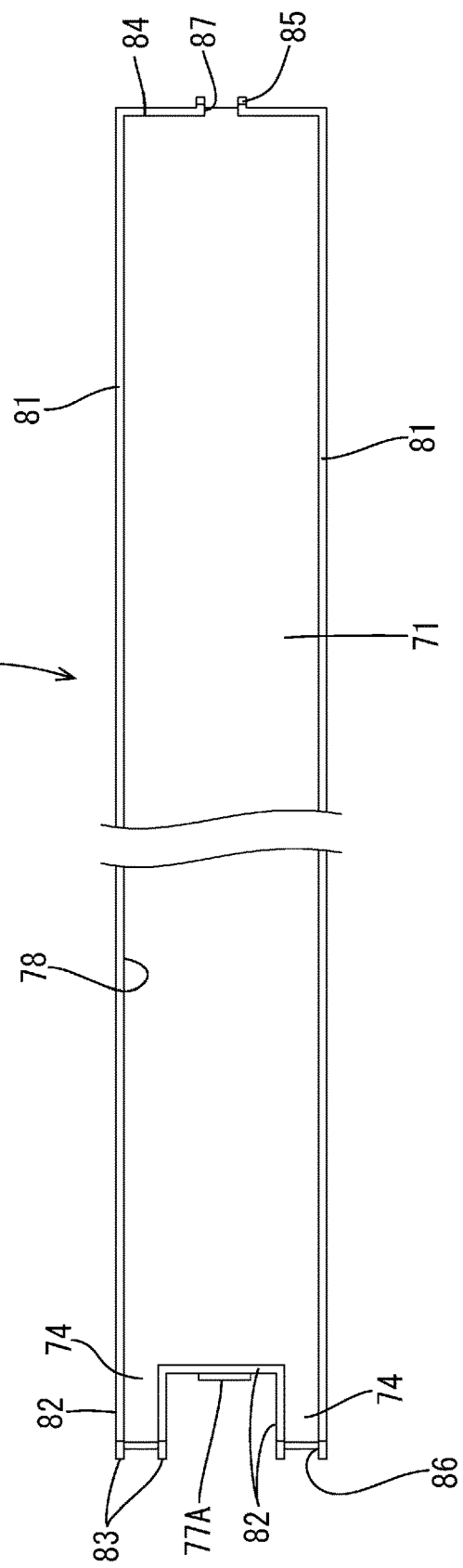
FIG. 10 is a plan view of a cover.
Figure 11:
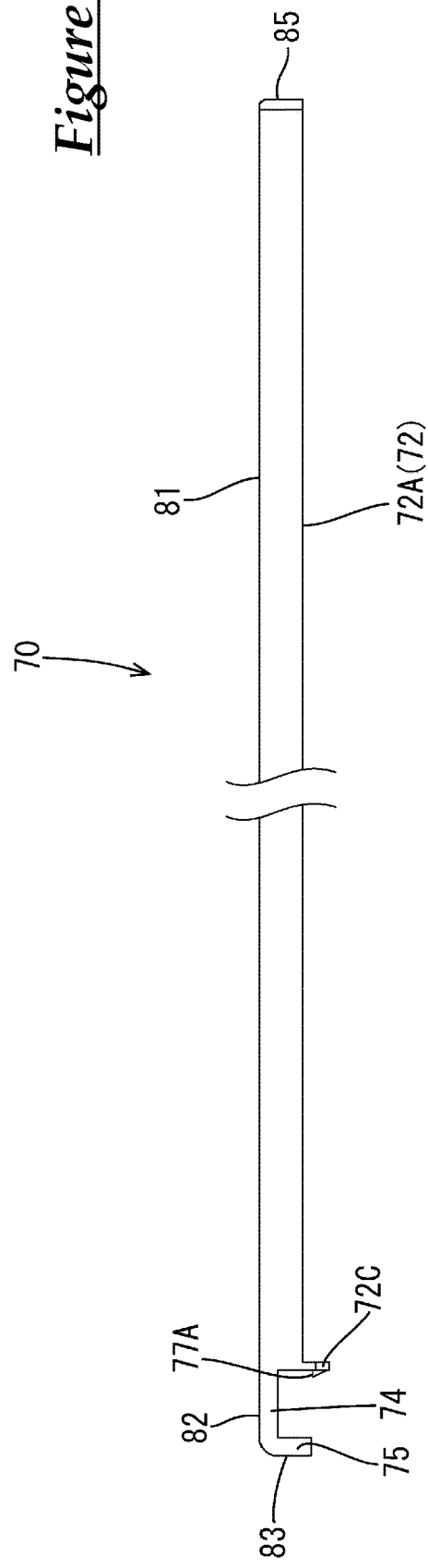
FIG. 11 is a front view of the cover.

As shown in FIGS. 10 and 11, the cover 70 is an elongated plate-shaped member, and covers the entirety of the resin protector 30. The cover 70 includes a main body portion 71 that is shaped as an approximately rectangular plate, and one end side in the lengthwise direction thereof (left side in FIG. 10, which is the fixed-side end side) is provided with a pair of protruding portions 74 that protrude along the lengthwise direction from respective end portions in the width direction. In other words, the one end side of the cover 70 is approximately shaped as a "U" having two right angles, in a plan view. Descending portions 75 that hang downward are provided on the leading end side of the protruding portion 74 (see FIG. 11).

Side wall portions 72 that extend downward are provided at the four side edge portions of the main body portion 71. Among these side wall portions 72, a pair of elongated side walls 72A, which extend from the side edge portions in the lengthwise direction of the main body portion 71, are fitted inward of the outer wall portion 33B of the bus bar holding portion 32 and the outer groove wall 42B of the wire housing groove 41 in the state where the cover 70 is attached to the resin protector 30 (see FIG. 6).

Note that in the dividing wall 33C of the above-described bus bar holding portion 32, the corner portion on the outer wall portion 33B and upper side is cut out into a step-like shape, and the elongated side walls 72A of the cover 70 are set with the same dimension as each other so as to be placed on the step portion 33D (see FIG. 6).

Out of the side wall portions 72, a free-side wall 72B, which is arranged on the free-side end portion side (right side in FIG. 10), couples the pair of elongated side walls 72A (see FIG. 4).

Also, out of the side wall portions 72, a fixed-side wall 72C, which is arranged on the fixed-side end side, is set with a higher height dimension than the elongated side wall 72A and the free-side wall 72B, and projects downward (see FIG. 11).

Figure 12:
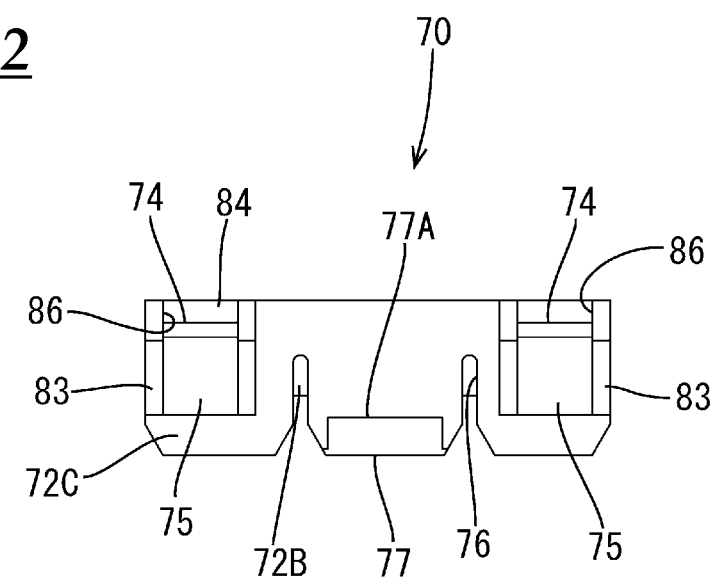
FIG. 12 is a left-side view of the cover.
Figure 13:
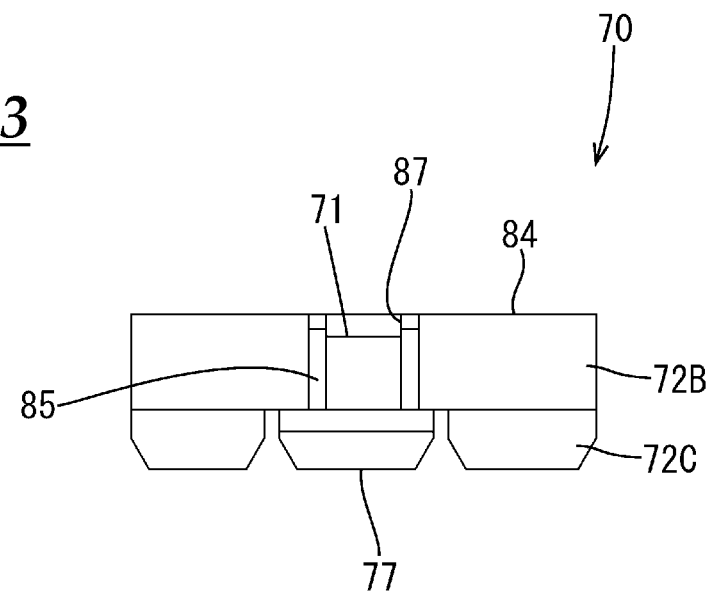
FIG. 13 is a right-side view of the cover.

As shown in FIG. 12, the lower approximately ⅔ of the region of the fixed-side wall 72C is divided into approximately three equal portions in the width direction by a pair of slits 76 that extend in the vertical direction. The portion arranged in the center is a fixing piece 77 that is located between the pair of protruding portions 74, and the leading end portion (lower end portion) thereof is provided with the locking claw 77A that projects outward and locks with the lower edge of the elastic locking piece 55 of the above-described resin protector 30 (see FIGS. 7 and 11). Note that the corner portions of the lower ends of the three divided pieces of the fixed-side wall 72C are all cut diagonally.

Also, the two edge portions in the lengthwise direction of the main body portion 71 are provided with lock-receiving ribs 81 (one example of a lock-receiving portion) that project upward. The locking claws 39A and 49A of the above-described first cover locking portions 39 and second cover locking portions 49 are locked to the upper face of the pair of lock-receiving ribs 81. These two lock-receiving ribs 81 are formed so as to be continuous over the entirety of the side edge portions in the lengthwise direction of the main body portion 71.

The cover 70 has an approximately H-shaped width-direction cross-section due to the pair of elongated side walls 72A and the pair of lock-receiving ribs 81 (see FIG. 6). In other words, the upper face of the cover 70 has a recessed cross-sectional shape in which the central portion in the width direction is recessed downward (toward the electric cell group 11).

Also, water-stop ribs 82 that rise upward are provided on the two side edge portions of the pair of protruding portions 74. Out of these water-stop ribs 82, the pair of water-stop ribs 82 that are arranged at the two end portions in the width direction of the cover 70 are integrally continuous with the above-described lock-receiving ribs 81.

Also, water-stop ribs 82 that rise upward from the main body portion 71 are provided on the end edge portions of the coupling portions between the pair of protruding portions 74.

Furthermore, lead-out ribs 83 that rise laterally from the electric cell group 11 (toward the left side in FIGS. 11 and 12) are provided on the two side edge portions of the pair of descending portions 75. These lead-out ribs 83 are integrally continuous with the water-stop ribs 82.

In the upper surface (the main body portion 71 and the protruding portion 74) of the fixed-side end of the cover 70, the peripheral edge portion is surrounded by the water-stop ribs 82, and the region continuous with the descending portions 75 is open (first opening portion 86) laterally from (toward the right side) the electric cell group 11.

On the other hand, a water-stop rib 84 that rises upward along the end edge portion of the main body portion 71 is provided on the other end side (right side in FIG. 10, which is the free-side end portion side) in the lengthwise direction of the cover 70. This water-stop rib 84 is integrally continuous with the lock-receiving ribs 81 so as to couple the pair of lock-receiving ribs 81. A portion is cut out from the central portion of the water-stop rib 84 (central portion in the width direction of the cover 70), thus forming a second opening portion 87 that is open laterally from the electric cell group 11 (toward the right side). Also, a pair of lead-out ribs 85 that extend in the vertical direction and rise laterally (toward the right side in FIGS. 10 and 11) from the side wall portion 72 (free-side wall 72B) of the cover 70, are provided continuous with the two end portions of the second opening portion 87 (see FIG. 4).

In other words, the upper face of the cover 70 is surrounded by the lock-receiving ribs 81 and the water-stop ribs 82 and 84, thus forming a recessed portion 78 that has a high peripheral edge portion and a recessed inward portion. Also, in this recessed portion 78, a portion of the peripheral edge portion is open laterally from the electric cell group 11 due to the first opening portion 86 of the fixed-side end and the second opening portion 87 of the free-side end portion.

Note that the length dimension of the main body portion 71 of the cover 70 is set to a dimension according to which, in the case where the electric cells 12 are arranged side-by-side with the maximum tolerance to give the electric cell group 11 the maximum length dimension (state shown in FIG. 8), even when covering the electric cell group 11 with this maximum length dimension, the bus bar holding portions 32 are not exposed to the outside.

When assembling the battery module 10 of the present embodiment described above, first, the coupling units 31 and the end coupling units 51 and 61 are coupled to each other. Specifically, the holding portion-side first coupling portion 36 of each of the coupling units 31 is sandwiched by the engaging piece 38 and the holding portion-side second coupling portion 37 of an adjacent coupling unit 31, and the groove portion-side second coupling portion 47 is fitted into and coupled to the groove portion-side first coupling portion 46. Accordingly, the resin protector 30 is completed, and the wire housing grooves 41 are coupled.

Next, the bus bars 21 are placed in the bus bar holding portions 32 of the resin protector 30. Then, voltage detection terminals connected to detection wires (not shown) are placed at predetermined positions inside the bus bar holding portions 32 of the resin protector 30 and placed on the bus bars 21. The detection electrical wires that are lead out from the barrel holding grooves are then arranged inside the wire housing grooves 41.

The wiring module 20 of the present embodiment assembled in this way is attached to the upper face (electrode face 12A) side of the electric cell group 11, in which the electrode terminals 13 are arranged side-by-side facing upward. Specifically, the electrode terminals 13 are inserted into the terminal through-holes 22 of the bus bars 21, the wiring module 20 is placed over the electric cell group 11, and connection nuts (not shown) are screwed onto the electrode terminals 13, thus electrically connecting positive and negative electrode terminals 13 that are adjacent to each other.

When all of the connections have been made, lastly, the fixing pieces 77 of the cover 70 are inserted between the elastic locking pieces 55 of the resin protector 30 and the dividing walls 33C adjacent thereto. At the same time, the entirety of the cover 70 is pressed from above so as to cover the resin protector 30.

Accordingly, the elastic locking pieces 55 elastically deform due to being pressed by the locking claws 77A of the fixing pieces 77, and the first cover locking portions 39 and the second cover locking portions 49 are pressed by the edge portions of the cover 70 and elastically deform outward. When the cover 70 reaches a defined position, these portions undergo elastic restoration, the locking claws 77A of the fixing pieces 77 lock to the leading end portions of the elastic locking pieces 55, and the first cover locking portions 39 and the second cover locking portions 49 lock to the lock-receiving ribs 81. The battery module 10 is thus completed.

In the cover 70 in this state, as shown in FIG. 6, the side wall portion 72 (elongated side wall 72A) on the bus bar holding portion 32 side is placed on the step portion 33D of the dividing wall 33C, and the lower face of the main body portion 71 is placed on the holding wall 33 and the holding portion-side groove wall 42A, thus being supported from below. In other words, the cover 70 is sandwiched from above and below by the resin protector 30. Also, one end side (fixed-side end) of the cover 70 is fixed to the resin protector 30 by the cover fixing portions 52 (elastic locking pieces 55 and fixing pieces 77), and the other end side (free-side end portion) is locked in a manner of being capable of moving along the arrangement direction of the electric cells 12.

According to the wiring module 20 and the battery module 10 of the embodiment described above, the lock-receiving ribs 81 of the cover 70 are engaged with the first cover locking portion 39 and the second cover locking portion 49 of the resin protector 30 on the upper face side of the cover 70. Accordingly, a worker can easily visually check the locked state of the cover 70 and the resin protector 30 without changing the viewpoint from the direction in which the wiring module 20 is attached to the electric cell group 11 (Y direction). Moreover, due to the locking structure being provided in the edge portion of the cover 70, the intrusion of foreign matter such as moisture or dust into the resin protector 30 can be suppressed more than with a configuration in which a locking hole is provided in a region of the cover 70 that is inward of the edge portion.

Also, the lock-receiving ribs 81 extend continuously in the two edge portions of the cover 70, and therefore the first cover locking portion 39 and the second cover locking portion 49 can be locked at any position in the side edge portions of the cover 70. In other words, tolerance can be absorbed.

Also, the cover fixing portion 52 (the elastic locking piece 55 and the locking claw 77A of the fixing piece 77) that fixes the resin protector 30 and the cover 70 is provided on one end (fixed-side end) side of the resin protector 30 and the cover 70, and therefore a portion of the cover 70 can be fixed so as to not separate from the resin protector 30, while also enabling the cover 70 to move in the arrangement direction of the electric cells 12 relative to the resin protector 30 (enabling tolerance absorption).

Also, the cover 70 includes the recessed portion 78 that extends in the arrangement direction of the electric cells 12 and is recessed toward the bus bar holding portion 32 in a state of covering the bus bar holding portion 32, and the first opening portion 86 and the second opening portion 87 that are open laterally from the electric cell group 11 are provided in portions of the recessed portion 78 in respective end portions in the arrangement direction of the electric cells 12. Accordingly, if moisture adheres to the upper face of the cover 70, the moisture accumulates inside the recessed portion 78, thus making it possible to suppress the case where moisture flows from the side edges of the cover 70 into the resin protector 30 or to the electrode faces 12A of the electric cells 12. Also, the moisture accumulated in the recessed portion 78 can be discharged laterally from the electric cell group 11 through the first opening portion 86 and the second opening portion 87.

Moreover, moisture that is discharged from the first opening portion 86 falls downward along the descending portions 75, and moisture that is discharged from the second opening portion 87 falls downward along the side wall portion 72 (free-side wall 72B), and therefore it is possible to more reliably suppress the case where moisture flows around to the underside of the cover 70 and intrudes into the resin protector 30.

Furthermore, the length of the cover 70 in the lengthwise direction is set longer than the maximum length of the resin protector 30 in the arrangement direction (the case where the alignment tolerance of the electric cells 12 is at the maximum), and the two end portions of the cover 70 in the lengthwise direction are arranged at positions separated from the two end portions of the resin protector 30 (electric cell group 11) in the lengthwise direction. Accordingly, it is possible to more reliably suppress the case where moisture that falls from the two end portions of the cover 70 intrudes into the resin protector 30.

Other Embodiments

The technology disclosed in the present specification is not intended to be limited to the embodiment described using the above description and drawings, and the technical scope also encompasses embodiments such as the following, for example.

In the configuration of the above embodiment, the lock-receiving ribs 81 are provided in the cover 70, and the first cover locking portions 39 and the second cover locking portions 49 of the resin protector 30 are locked thereto, but the lock-receiving ribs 81 are not necessarily required to be provided. For example, a configuration is possible in which locking portions provided in the resin protector are directly locked to an edge portion of a flat plate-shaped cover. Alternatively, a configuration is possible in which a step-like shape is cut out from an edge portion of the cover, and a locking portion is locked to that step-like portion.

Although the lock-receiving portions (lock-receiving ribs 81) are continuous in edge portions of the cover 70 in the configuration in the above embodiment, the lock-receiving portions may be discontinuous. In other words, it is sufficient to be able to be locked with the resin protector so as to be able to absorb tolerance as the resin protector 30 extends and retracts.

The locking portions provided in the resin protector are not limited to the above embodiment, and aspects are possible in which, for example, an edge portion of the cover is sandwiched from above and below, or an edge portion of the cover is locked in a continuous manner as with a rail or the like.

Although the resin protector 30 is obtained by coupling multiple coupling units 31 in the configuration of the above embodiment, the resin protector may have another extensible configuration that employs hinges or the like.

Although one end side of the cover 70 is fixed to the resin protector 30 in the aspect described in the above embodiment, the one end side is not necessarily required to be fixed. Alternatively, a configuration is possible in which a region that is inward in the lengthwise direction is used for fixing, instead of the one end side. Also, the fixing structure is not limited to the above embodiment.

Although the recessed portion 78 is provided in the upper face of the cover 70 in the configuration of the above embodiment, the recessed portion is not necessarily required to be provided. Also, although the recessed portion 78 is constituted by the pair of lock-receiving ribs 81 and the water-stop ribs 84 in the configuration of the above embodiment, a configuration is possible in which the recessed portion is provided by curving the main body portion 71 itself into a recessed shape.

The number of opening portions and the positions thereof are not limited to the above embodiment. Also, instead of providing the opening portions in portions of the two end portions of the cover as in the above embodiment, the entirety of the two end portions may be set as opening portions.

The descending portions 75 can be omitted. Also, the length dimension of the descending portions 75 may be set to a dimension for extending downward beyond the resin protector 30.

Although the two end portions of the cover 70 are arranged at positions separated from the two end portions of the resin protector 30 (electric cell group 11) in the above embodiment, a configuration is possible in which the cover is arranged at the same position as at least one end portion of the resin protector.

Although multiple electric cells 12 are connected in series in the configuration of the above embodiment, there is no limitation to this, and a configuration is possible in which multiple electric cell groups 11 are connected in parallel.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above.

Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Battery module (power storage module)
11 Electric cell group (power storage element group)
12 Electric cell (power storage element)
12A Electrode face
13 Electrode terminal
20 Wiring module
21 Bus bar
30 Resin protector
32 Bus bar holding portion (holding portion)
33 Holding wall
39 First cover locking portion (locking portion)
39A Locking claw
41 Wire housing groove
49 Second cover locking portion (locking portion)
49A Locking claw
52 Cover fixing portion
55 Elastic locking piece (fixing portion)
70 Cover
71 Main body portion
72 Side wall portion
74 Protruding portion
75 Descending portion
77 Fixing piece (fixing portion)
78 Recessed portion
81 Lock-receiving rib (lock-receiving portion)
82, 84 Water-stop rib
83, 85 Lead-out rib
86 First opening portion
87 Second opening portion
X Extending direction of electric cells (extending direction of power storage elements)
Y Projecting direction of electrode terminals

The invention claimed is:

1. A wiring module capable of attachment to a power storage element group in which a plurality of power storage elements are arranged side-by-side, each of the power storage elements having an electrode face on which positive and negative electrode terminals are provided, the wiring module comprising:
a plurality of bus bars that electrically connect the electrode terminals to each other;
a resin protector that has one or a plurality of holding portions that hold the plurality of bus bars, and is provided with a tolerance absorbing portion that absorbs tolerance in an arrangement direction of the power storage elements; and
a cover that is attached to the resin protector and covers all of the holding portions,
wherein the resin protector is provided with a locking portion that locks the cover, the locking portion projecting in a direction identical to a projecting direction of the electrode terminals and extending along the arrangement direction,
the cover is provided with a lock-receiving portion that is locked to the locking portion, and
the locking portion and the lock-receiving portion are locked in a manner of enabling relative movement along the arrangement direction at an edge portion of the cover that extends in the arrangement direction, wherein the tolerance absorbing portion of the resin protector absorbs tolerance such that the locking portion is configured to slide along the lock-receiving portion while remaining engaged with the lock-receiving portion in response to movement of the power storage elements relative to the cover along the arrangement direction of the power storage elements.

2. The wiring module according to claim 1, wherein the locking portion includes a first locking portion that is provided on one side corresponding to one of a pair of edge portions that extend in the arrangement direction, and a second locking portion that is provided on another side corresponding to another one of the pair of edge portions, and the first locking portion and the second locking portion are a plurality of locking claws that rise in the direction identical to the projecting direction of the electrode terminals.

3. The wiring module according to claim 1, wherein the lock-receiving portion extends in a continuous manner along the arrangement direction.

4. The wiring module according to claim 1, wherein a fixing portion that fixes the cover to the resin protector is provided on one end side, with respect to the arrangement direction, of the resin protector and the cover.

5. The wiring module according to claim 1,
wherein the power storage elements are arranged side-by-side with the electrode faces facing upward,
the cover includes a recessed portion that extends in the arrangement direction and is recessed toward a holding portion side in a state of covering the holding portions, and
an opening portion that is open laterally from the power storage element group is provided in at least a portion of two end portions of the recessed portion in the arrangement direction.

6. The wiring module according to claim 5, wherein a descending portion is provided descending downward from the opening portion, and lead-out ribs are provided rising outward on two side edges of the descending portion.

7. The wiring module according claim 1, wherein the length of the cover in the arrangement direction is set longer than a maximum length of the resin protector in the arrangement direction, and two end portions of the cover in the arrangement direction are arranged at positions separated from two end portions of the resin protector in the arrangement direction.

8. A power storage module comprising:
the power storage element group; and
the wiring module according to claim 1, the wiring module being attached to the power storage element group.

* * * * *